United States Patent
Mehlhorn

(10) Patent No.: US 7,355,520 B2
(45) Date of Patent: Apr. 8, 2008

(54) MOTOR DIAGNOSTIC INDICATOR

(75) Inventor: William L. Mehlhorn, Menomonee Falls, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 252 days.

(21) Appl. No.: 10/902,336

(22) Filed: Jul. 29, 2004

(65) Prior Publication Data

US 2006/0022534 A1 Feb. 2, 2006

(51) Int. Cl.
*G08B 21/00* (2006.01)

(52) U.S. Cl. .................... 340/648; 340/661; 310/68 R; 318/770

(58) Field of Classification Search ................. 340/648
See application file for complete search history.

(56) References Cited

U.S. PATENT DOCUMENTS

| | | | |
|---|---|---|---|
| 3,465,184 A * | 9/1969 | Armstrong et al. ........... 310/66 |
| 3,778,801 A | 12/1973 | Nudelmont | |
| 3,840,780 A | 10/1974 | Sons | |
| 3,947,764 A | 3/1976 | Abbott | |
| 3,999,176 A | 12/1976 | Kellogg et al. | |
| 4,429,242 A * | 1/1984 | Layh ............................ 310/71 |
| 4,482,892 A | 11/1984 | Farag et al. | |
| 4,514,724 A | 4/1985 | Valentine | |
| 4,638,196 A * | 1/1987 | Kranzler ....................... 310/50 |
| 4,864,287 A * | 9/1989 | Kierstead .................... 340/648 |
| 4,879,625 A | 11/1989 | Potenzone | |
| 4,998,097 A * | 3/1991 | Noth et al. ................. 340/648 |
| 5,416,399 A | 5/1995 | Brunson | |
| 5,568,033 A | 10/1996 | Brunson | |
| 5,917,428 A * | 6/1999 | Discenzo et al. ...... 340/870.01 |
| 6,297,742 B1 * | 10/2001 | Canada et al. .............. 340/635 |
| 6,376,938 B1 | 4/2002 | Williams | |
| 6,538,420 B2 | 3/2003 | Bald et al. | |

* cited by examiner

*Primary Examiner*—George Bugg
(74) *Attorney, Agent, or Firm*—Michael Best & Friedrich LLP

(57) ABSTRACT

A motor receiving power from a power source. The motor comprises a motor housing, a stator at least partially disposed within the motor housing and supported by the motor housing, a rotor disposed to magnetically interact with the stator, and a visual indicator integrated with the housing.

28 Claims, 4 Drawing Sheets

MOTOR DIAGNOSTIC INDICATOR

BACKGROUND OF THE INVENTION

The present invention relates to a motor, and particularly to indicating diagnostic information of a motor.

A common motor type is dual-voltage motor. An example dual-voltage motor is a motor configured to run on either a 115 VAC power source or a 230 VAC power source. To provide dual voltages, the wiring configuration of the motor is varied. For example, the motor wiring configuration can include a jumper plug under an end canopy of the motor. The jumper plug is inserted at two different positions—a 115 VAC position and a 230 VAC position. In many instances, the jumper plug is inserted at the 115 VAC, and therefore uses the 115 VAC position as a default power source position. That is, the motor is configured for a 115 VAC power source when the jumper plug remains plugged in the default 115 VAC position. Similarly, the motor is configured for a 230 VAC power source when the jumper plug is plugged in the 230 VAC position.

When the jumper plug is placed at an improper position, the motor may be connected to an undesirable voltage. This may result in damage to the motor or the thermal protector of the motor. For example, a lot of appliances such as spas run on 230 VAC, but not on 115 VAC. If the dual voltage replacement motor is connected to a 115 VAC power source, the motor will run at a much lesser rate, and typically fails to reach the rated speed. Conversely, if the motor is configured for a 115 VAC power source, but is connected to a 230 VAC power source, the motor may burn out.

Furthermore, to diagnose an operating status or condition of a motor used in some applications, like a jetted-fluid appliance (e.g., a spa), may be cumbersome. For example, the internal structure of a typical spa is very dense, and includes large amounts of tubes, pipes, and wires. As a result, getting inside the spa to open up a motor, connecting a measurement instrument to the motor, or determining the operating status of the motor can become problematic.

SUMMARY OF THE INVENTION

Accordingly, there is a need for a visual indicator on the motor that indicates an operating status or condition of the motor. In on embodiment, the invention provides a visual indicator circuit that turns on a combination of light emitting diodes ("LED") on a motor housing. In this way, a serviceman can simply look at the LED's and diagnose an operating status of the motor. In one form, the invention provides an electric machine capable of receiving power from a power source. The electric machine includes a stator core, a housing fastened to the stator core, and an indicator integrated on the housing to determine at least one property of the received power and to display the property thereon.

In another form, the invention provides a motor capable of receiving power from a power source. The motor includes a motor housing, a bearing supported by the motor housing, a stator disposed within the motor housing and supported by the motor housing, and a rotor disposed in the housing and disposed to magnetically interact with the stator. Specifically, the rotor includes a shaft supported by the bearing, and the shaft defines an axis and extends beyond the motor housing in an axial direction. The motor also includes a comparator coupled to the motor housing. The comparator compares a property of the received power and a reference property. A display integral with the housing displays the compared property.

In yet another form, the invention provides a method of diagnosing an operational status of a motor. The motor includes a motor housing, a stator, and a rotor at least partially disposed within the motor housing and supported by the motor housing. The rotor also includes a shaft supported by the motor housing, such that the shaft defines an axis and is disposed to extend beyond the motor housing in an axial direction. The motor also includes a display supported by the motor housing. The method includes wiring the motor to a power source, and visually indicating an operating status of the motor.

In yet another form, the invention provides an electric machine capable of receiving power from a power source. The electric machine includes a stator core, a housing supporting the stator core, and an indicator integrated on the housing to determine at least one property of the received power and to display the property thereon.

In yet another form, the invention provides an electric machine capable of receiving power from a power source. The electric machine includes a stator core, a housing supporting the stator core, a comparator coupled to the housing and configured to compare a property of the received power and a reference property, and a display integral with the housing and adapted to display the compared property.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connect," "couple," "support," and "mount" and variations thereof herein are used broadly and encompass direct and indirect connections, couplings, supports, and mountings. In addition, the terms "connected" and "coupled" and variations thereof are not restricted to physical or mechanical connections or couplings.

Figure 1:
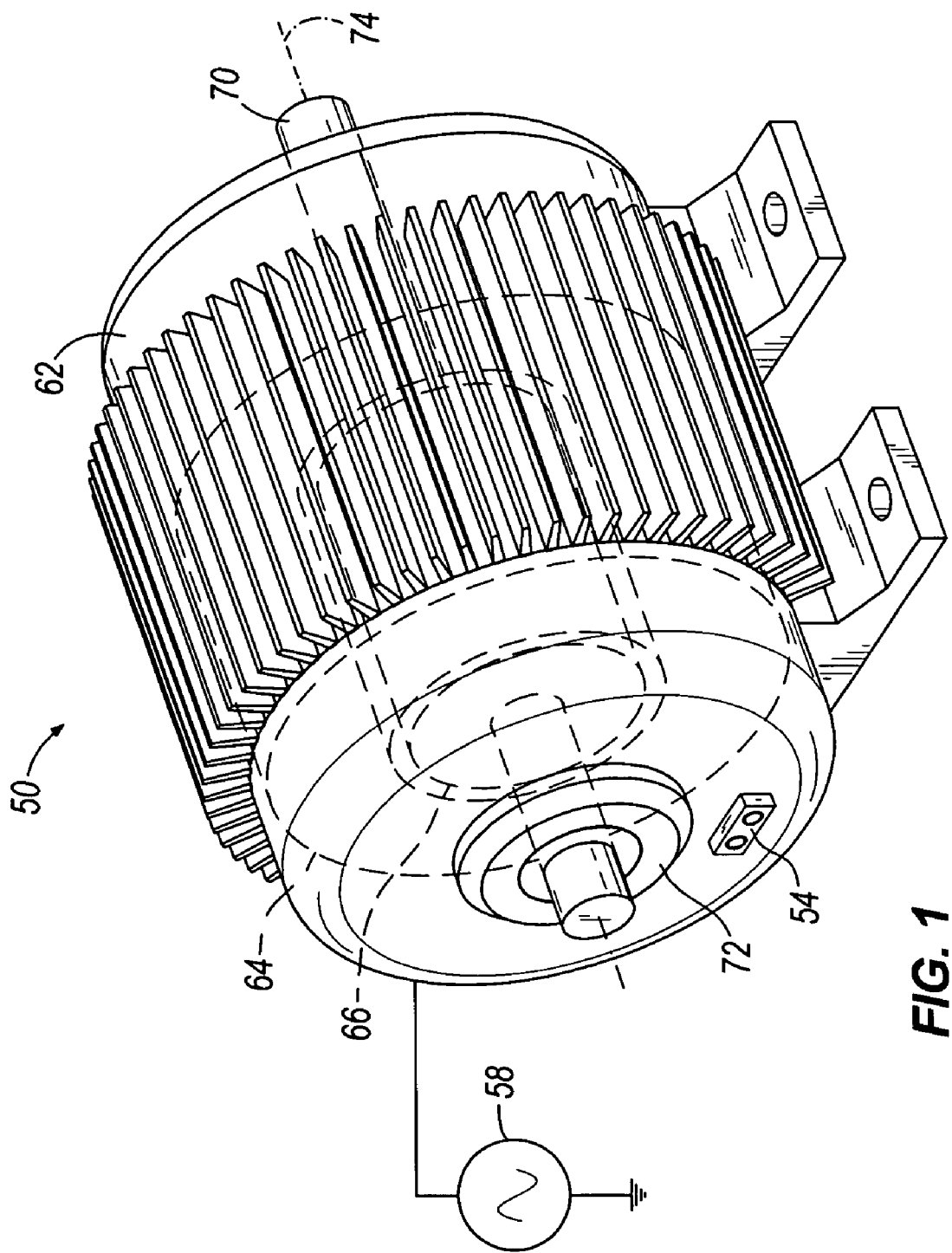
FIG. 1 is an exemplary motor of the invention.

FIG. 1 shows a motor 50 that includes a diagnostic indicator 54 (also referred to herein as a visual indicator). Although FIG. 1 shows the diagnostic indicator 54 implemented on a dual voltage motor 50, the diagnostic indicator 54 can be implemented on other types of motors. The motor 50 receives power from a power source 58. The power source can be a 230 VAC power source or a 115 VAC power source depending on the application. Furthermore, although the diagnostic indicator 54 is located on a side of the motor 50, the diagnostic indicator 54 can also be located on other parts of the motor 50.

The motor 50 includes a motor housing 62. Although the motor 50 is shown to have a single housing, other types of housing (such as an open-frame housing) can be used. Generally, the motor housing 62 directly houses and supports a stator 64 and a rotor 66. The rotor 66 is coupled to or interconnected with a shaft 70, which extends from or through the motor housing 62. One or more bearings 72 supported by the motor housing 62 supports the shaft 70. The shaft 70 also defines an axis 74 such that the shaft 70 extends beyond the motor housing 62 in an axial direction. The stator 64 is at least partially disposed within the motor housing 62 and is supported by the motor housing 62. When energized, the rotor 66 magnetically interacts with the stator 64. Generally, the visual indicator 54 is integrated on the motor housing 62 to determine at least one property of the power received from the power source 58, and to display the property thereon.

Figure 2:
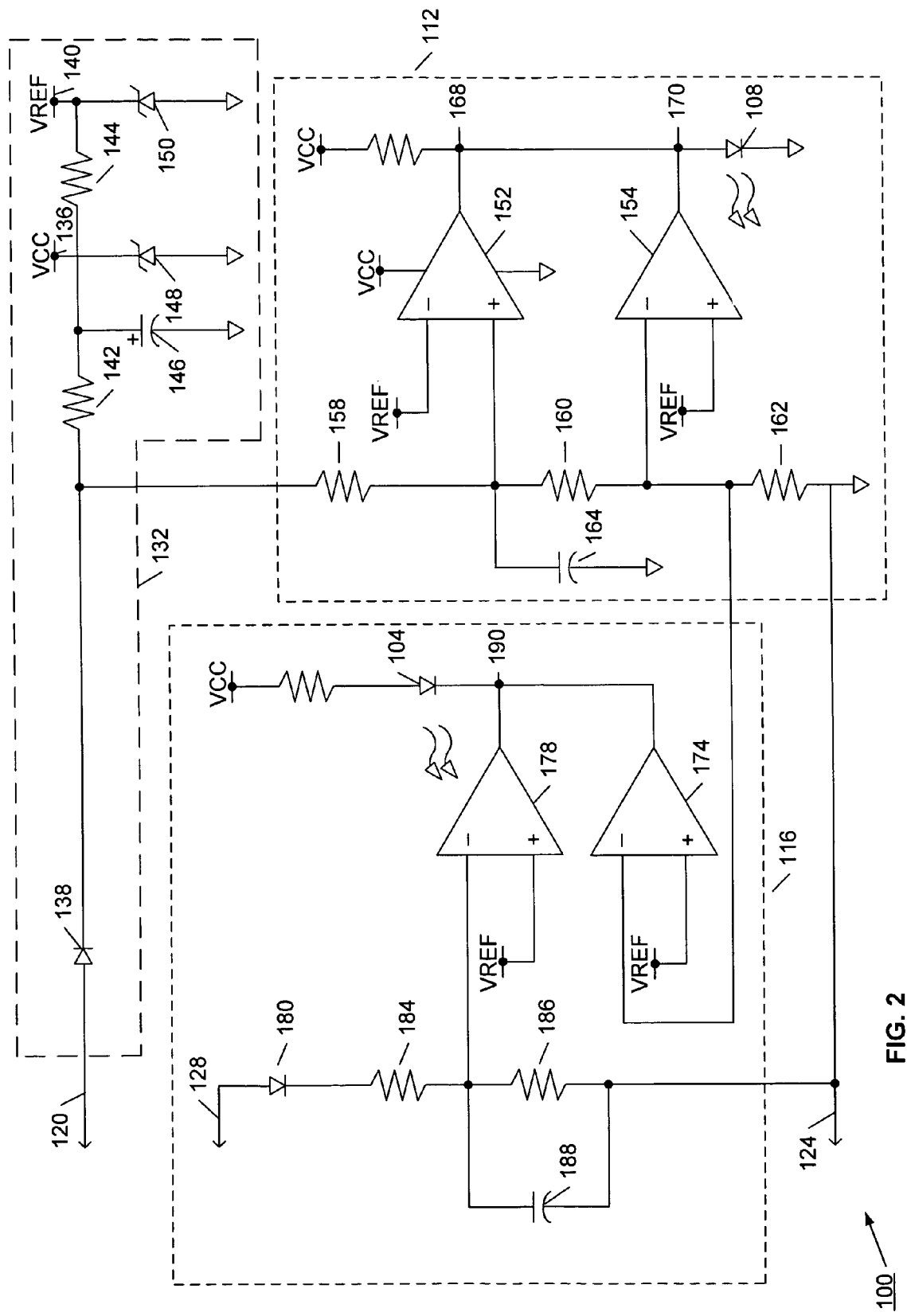
FIG. 2 is an electric schematic representing a diagnostic indication capable of being used with the motor of FIG. 1.

FIG. 2 represents a motor diagnostic indicator circuit 100 that is coupled to the pump motor 50 to display an operating status of the motor. The circuit 100 has two light emitting diodes ("LED's") 104 and 108 to indicate or to display the operating status of the motor 50. Generally, the circuit 100 includes two sets of window comparators 112 and 116 that compare an electrical property of the power received from the power source 58 with respect to a reference property, such as a reference voltage. The window comparators 112 and 116 detect voltages applied to the motor 50, and determine if the applied voltages are proper. If the applied voltages are within a predetermined window, an associated LED lights.

More specifically, the motor diagnostic indicator circuit 100 is coupled to the motor 50 with three electrical connections 120, 124 and 128. The electrical connection 120 couples a motor mid-windings connection to a power supply 132 of the circuit 100. The power supply 132 generates power, $V_{cc}$, for the circuit at node 136 by rectifying the voltage signal from the motor mid-windings electrical connection 120 with a diode 138, and a combination of limiting resistor 142, filtering capacitor 146, and Zener diode 148. The power supply 132 also generates a reference voltage, $V_{ref}$, for the circuit at node 140 via resistor 144 and Zener diode 150.

The window comparator 112 includes a pair of comparators 152 and 154 to look for a voltage window between about 80 VAC and about 150 VAC. Of course other voltages are possible. More specifically, to detect the voltage window, the rectified voltage from diode 138 is applied to a resistive voltage divider comprising resistors 158, 160 and 162 in series and being filtered by capacitor 164. If the rectified DC voltage is below 80 VAC or above 150 VAC, either comparator 152 or comparator 154 will be activated or turned on. When either of the comparators 152 or 154 is activated, a respective output at node 168 or 170 will be low, and the LED 108 is turned off. Further, comparator 154 senses an over-voltage condition when the rectified DC voltage is greater than 150 VAC, while comparator 152 senses an under-voltage condition when the rectified DC voltage is less than 80 VAC. In one construction, the LED 108 is a green LED. However, other LED colors can also be used depending on the application. Also, other types of window comparators can also be used for the window comparator 112.

The second window comparator 116 also includes a pair of comparators 174 and 178 coupled to a thermal protector of the motor 50 via electrical connection 128 to receive a voltage from across the thermal protector. A diode 180 rectifies the thermal protector voltage, and applies the rectified voltage to the comparators 174 and 178 via another voltage divider consisting of resistors 184 and 186, and being filtered by capacitor 188. If the thermal protector is open, the DC rectified voltage is greater than $V_{ref}$ and the comparator 178 generates an active low output, lighting the LED 104. In one construction, the LED 104 is a red LED. However, other LED colors can also be used depending on the application.

When the voltage applied to the motor 50 is greater than 150 VAC, the comparator 174 generates an active low output. That is, the comparator 174 generates a low voltage at node 190, which generates a voltage potential difference across the diode 104. This lights the diode 104. In this way, when there is an over-voltage condition, but the thermal protector is not open, only the LED 104 is lit. On the other hand, if both LED 104 and 108 are lit, the thermal protector is open. If only the LED 108 is lit, power applied to the motor 50 is considered proper. However, if neither LED 104 nor 108 is lit, insufficient power is applied to the motor 50. In such a case, if the motor 50 is running, it indicates a 115 VAC power source is applied to a 230 VAC configured motor.

Figure 3:
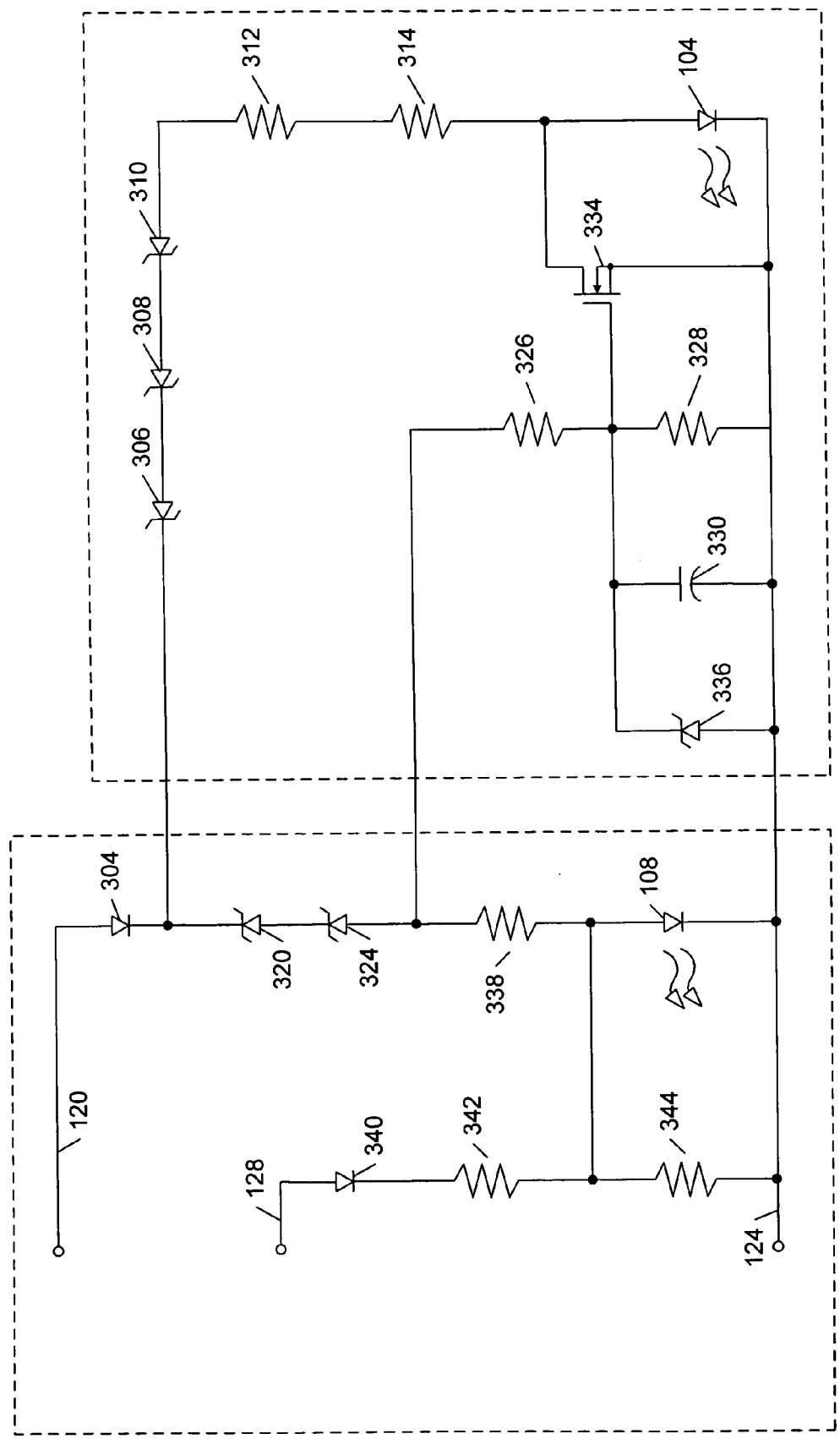
FIG. 3 is an electric schematic representing a second diagnostic indication capable of being used with the motor of FIG. 1.

FIG. 3 represents an alternative circuit diagram 300 that can be coupled to the pump motor 50 to display an operating status of the motor 50. Like parts are referenced with like numerals. Unlike circuit 100, the circuit 300 does not include a power supply. Rather, the LED's are lit with power directly from voltages detected within the motor 50. The circuit 300 is also connected to the motor 50 via the same electrical connections 120, 124, and 128. The electrical connection 120 couples the circuit 300 to the motor mid-windings connection of the motor 50.

Generally, the circuit 300 measures the voltage between the motor mid-windings connection 120 and the line hot connection 124. The circuit 300 also determines if the voltage is within a range of about 80 VAC to 150 VAC. The voltage signal from motor mid-windings connection 120 to the hot line connection 124 is rectified at diode 304. If the rectified voltage is greater than about 100 VDC, a series of Zener diodes 306, 308, and 310 breaks over causing a current to flow through resistors 312 and 314. In such a case, the LED 104 lights. Conversely, if the voltage from the mid-windings connection becomes greater than about 210 VAC, diode 304 continues to rectify the voltage, Zener diodes 320 and 324 break over causing a current to flow through a series of resistors 326 and 328. The current therefore charges up capacitor 330, turns on a MOSFET transistor 334, and turns off the LED 104. Zener diode 336 keeps the gate voltage on the MOSFET transistor 334 from getting too high such that the transistor 334 may burn out.

If the voltage between the motor mid-windings connection 120 and the line hot connection 124 becomes excessive, for example, greater than 210 VDC at any point of a line cycle, current flows through diodes 320 and 324, and resistor 338 and the LED 108 lights. If a voltage appears on the thermal protector, the thermal protector is open. In such a case, diode 340 conducts causing a current to flow through a voltage divider consisting of resistors 342 and 344, and in turn lights the LED 108. In this way, when there is an over-voltage condition, but the thermal protector is not open, only the LED 104 is lit. On the other hand, if both LED 104 and 108 are lit, the thermal protector is open. If only the LED 108 is lit, power applied to the motor 50 is considered proper. However, if neither LED 104 nor 108 is lit, insufficient power is applied to the motor 50. In such a case, if the motor 50 is running, it indicates a 115 VAC power source is applied to a 230 VAC configured motor.

Figure 4:
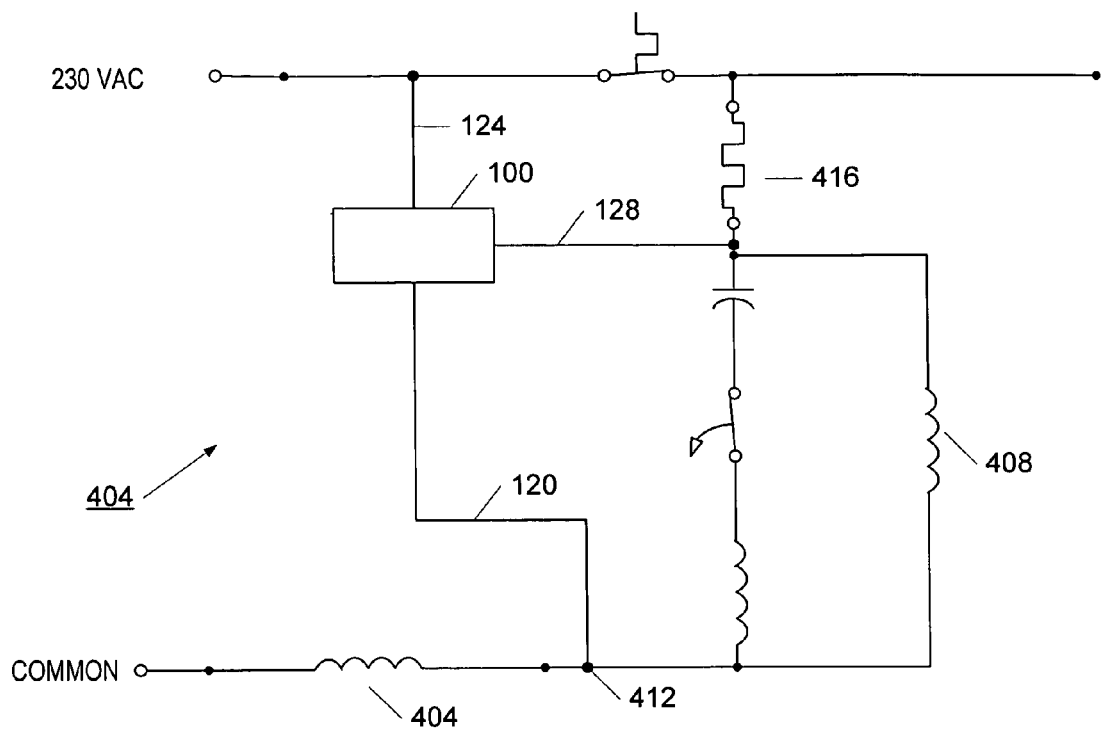
FIG. 4 is an electric schematic representing a high voltage connection for the motor of FIG. 1.
Figure 5:
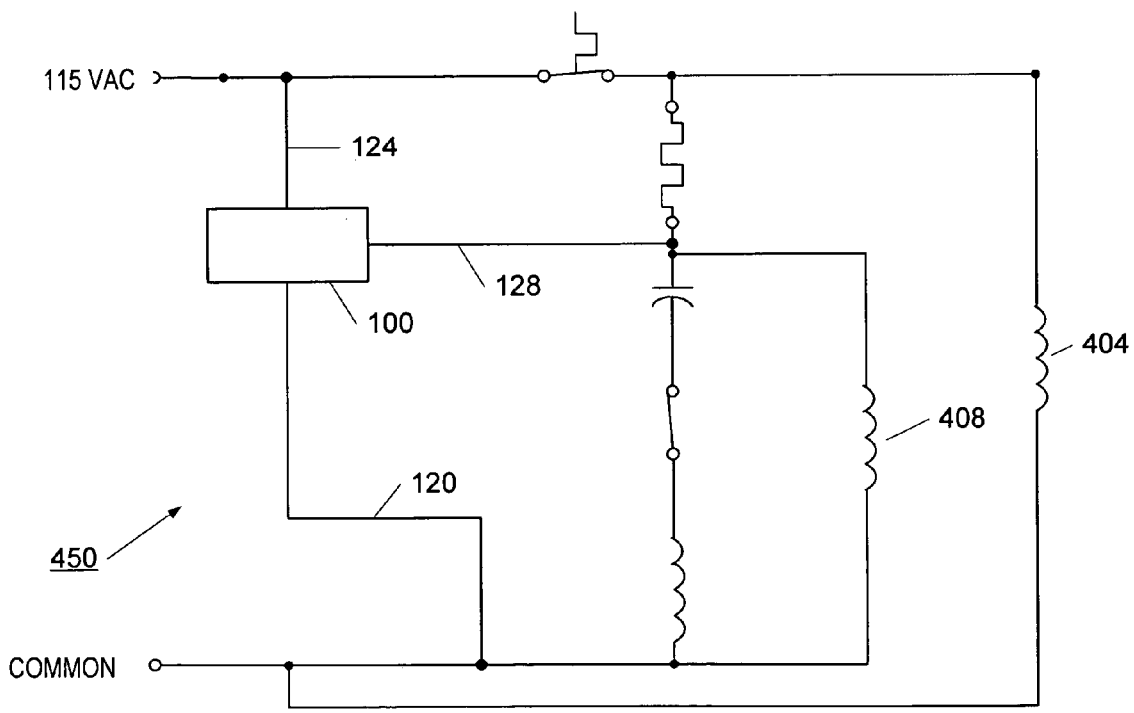
FIG. 5 is an electric schematic representing a low voltage connection for the motor of FIG. 1.

FIG. 4 shows a high voltage schematic diagram 400 of the dual voltage motor 50 coupled to either of the circuits 100 or 300. In high voltage operation mode, a main winding 404 is placed in series within the motor so that the two main windings 404 and 408 are also in series. In this way, a 115 VAC is applied to each of the main windings 404 and 408 in a 230 VAC application. Node 412 therefore provides the motor mid-windings connection line 120. The thermal protector line 128 is coupled to a thermostat with heater 416. Similarly, FIG. 5 shows a low voltage schematic diagram 450 of the dual voltage motor 50 coupled to either of the circuits 100, 300. In low voltage operation mode, the main windings 404 and 408 are placed in parallel. Thus, both windings have 115 VAC applied to them.

Various features and advantages of the invention are set forth in the following claims.

The invention claimed is:

1. A motor configured to receive power from a power source, the motor comprising:
   a motor housing;
   a stator at least partially disposed within the motor housing and supported by the motor housing;
   a rotor disposed to magnetically interact with the stator, the rotor comprising a shaft supported by the motor housing, the shaft defining an axis and being disposed to extend beyond the motor housing in an axial direction;
   a motor diagnostic indicator circuit electrically connected to the power source to receive an input power, the motor diagnostic indicator circuit being supported by the motor housing, and adapted to determine and display at least one of a proper power connected condition, an over-voltage connected condition, and an under-voltage connected condition based on comparing the input power to a reference property; and
   a thermal protector connected to a stator winding and operable to provide a voltage in an open condition to the motor diagnostic indicator circuit, the motor diagnostic indicator circuit further adapted to determine and display a thermal protector open condition based on the voltage.

2. The motor of claim 1, and wherein the motor diagnostic indicator circuit comprises at least one light emitting diode.

3. The motor of claim 1, and wherein the motor diagnostic indicator circuit flashes a light emitting diode a first plurality of times to indicate a property of the motor.

4. The motor of claim 1, wherein the motor diagnostic indicator circuit comprises a dual-voltage circuitry configured to run the motor at one of two voltages.

5. The motor of claim 1, wherein the motor diagnostic indicator circuit comprises a window comparator configured to sense at least one of an over-voltage condition, and an under-voltage condition, and a thermal protector voltage.

6. The motor of claim 1, further comprising a rectifying circuit configured to supply power to the motor diagnostic indicator circuit.

7. The motor of claim 1, and wherein the motor diagnostic indicator circuit couples to the motor at least one of a hot wire, a mid connection, and a common.

8. A motor capable of receiving power from a power source, the motor comprising:
   a motor housing;
   a bearing supported by the motor housing;
   a stator disposed within the motor housing and supported by the motor housing;
   a rotor disposed in the housing and disposed to magnetically interact with the stator, the rotor comprising a shaft supported by the bearing, the shaft defining an axis and extending beyond the motor housing in an axial direction;
   a comparator coupled to the motor housing, the comparator electrically connected to the power source and configured to compare a property of the received power and a reference property, and further configured to determine an over-voltage condition and an under-voltage condition based on comparing the received power to the reference property; and
   a display integral with the housing and coupled to the comparator, and adapted to display the determined condition.

9. The motor of claim 8, and wherein the display comprises at least one light emitting diode.

10. The motor of claim 8, and wherein the display flashes a first plurality of times to indicate a property of the motor.

11. The motor of claim 8, further comprising a dual-voltage circuitry coupled to the display, and configured to run the motor at one of two voltages.

12. The motor of claim 8, further comprising a rectifying circuit configured to supply power to the display.

13. The motor of claim 8, and wherein the display couples to the motor at least one of a hot wire, a mid connection, and a common.

14. A method of diagnosing an operational status of a motor, the motor comprising a motor housing, a stator and a rotor at least partially disposed within the motor housing and supported by the motor housing, the rotor comprising a shaft supported by the motor housing, the shaft defining an axis and being disposed to extend beyond the motor housing in an axial direction, and a display supported by the motor housing, the method comprising:
   wiring the motor to a power source;
   receiving power from the power source to the motor;
   detecting the power from the power source with a visual indicator electrically connected to the power source;
   determining an over-voltage connected condition, and an under-voltage connected condition of the motor based on comparing the detected power to a reference property; and
   visually indicating the determined condition of the received power with the visual indicator.

15. The method of claim 14, and wherein visual indicating further comprises activating at least one light emitting diode.

16. The method of claim 14, and wherein visual indicating further comprises flashing a first plurality of times to indicate a property of the motor.

17. The method of claim 14, further comprising running the motor at one of two voltages.

18. The method of claim 14, further comprising comparing the voltage received at the motor with a reference voltage.

19. The method of claim 14, further comprising supplying a rectified power to the display.

20. The method of claim 14, further comprising coupling the display to the motor at least one of a hot wire, a mid connection, and a common.

21. An electric machine capable of receiving power from a power source, the electric machine comprising:
- a stator core;
- a housing supporting the stator core; and
- a visual indicator electrically connected to the power source, the indicator being integrated with the housing and interconnected with a motor diagnostic indicator circuit, the circuit adapted to determine and display information indicating an over-voltage connected condition and an under-voltage connected condition based on comparing an input power to a reference property.

22. The electric machine of claim 21, further comprising a rotor disposed to magnetically interact with the stator core, the rotor comprising a shaft supported by the motor housing, the shaft defining an axis and being disposed to extend beyond the motor housing in an axial direction.

23. The electric machine of claim 21, and wherein the motor diagnostic indicator circuit comprises at least one light emitting diode.

24. The electric machine of claim 21, and wherein the motor diagnostic indicator circuit flashes a light emitting diode a first plurality of times to indicate a property of the motor.

25. The electric machine of claim 21, further comprising a dual-voltage circuitry coupled to and configured to run the electric machine at one of two voltages.

26. The electric machine of claim 21, wherein the motor diagnostic indicator circuit comprises a window comparator configured to sense at least one of an over-voltage condition, and an under-voltage condition.

27. The electric machine of claim 21, further comprising a rectifying circuit configured to supply power to the motor diagnostic indicator circuit.

28. The electric machine of claim 21, and wherein the motor diagnostic indicator circuit couples to the motor at at least one of a hot wire, a mid connection, and a common.

* * * * *